United States Patent
Yoo

(10) Patent No.: US 12,471,803 B2
(45) Date of Patent: Nov. 18, 2025

(54) ULTRASONIC VOLUME MEASUREMENT DEVICE AND ULTRASONIC VOLUME MEASUREMENT SYSTEM COMPRISING SAME

(71) Applicants: EDGECARE INC., Seoul (KR); SOGANG UNIVERSITY RESEARCH & BUSINESS DEVELOPMENT FOUNDATION, Seoul (KR)

(72) Inventor: Yang Mo Yoo, Goyang-si (KR)

(73) Assignees: EDGECARE INC., Seoul (KR); SOGANG UNIVERSITY RESEARCH & BUSINESS DEVELOPMENT FOUNDATION, Seoul (KR)

( * ) Notice: Subject to any disclaimer, the term of this patent is extended or adjusted under 35 U.S.C. 154(b) by 0 days.

(21) Appl. No.: 18/554,708

(22) PCT Filed: Mar. 2, 2022

(86) PCT No.: PCT/KR2022/002920
§ 371 (c)(1),
(2) Date: Oct. 10, 2023

(87) PCT Pub. No.: WO2022/220400
PCT Pub. Date: Oct. 20, 2022

(65) Prior Publication Data
US 2025/0072783 A1    Mar. 6, 2025

(30) Foreign Application Priority Data
Apr. 16, 2021 (KR) .................. 10-2021-0049928

(51) Int. Cl.
A61B 5/107 (2006.01)
A61B 8/00 (2006.01)
A61B 8/08 (2006.01)

(52) U.S. Cl.
CPC .......... *A61B 5/1073* (2013.01); *A61B 8/4477* (2013.01); *A61B 8/4494* (2013.01); *A61B 8/483* (2013.01)

(58) Field of Classification Search
CPC ... A61B 5/1073; A61B 8/4477; A61B 8/4494; A61B 8/483
See application file for complete search history.

(56) References Cited

U.S. PATENT DOCUMENTS

| | | | | |
|---|---|---|---|---|
| 2003/0055308 A1* | 3/2003 | Friemel | .................... | A61B 8/14 600/15 |
| 2013/0338506 A1* | 12/2013 | Kim | .................... | G01S 7/52093 600/447 |
| 2014/0046187 A1* | 2/2014 | Taniguchi | .............. | A61B 8/463 600/444 |

FOREIGN PATENT DOCUMENTS

| | | | |
|---|---|---|---|
| JP | 2001-198122 A | 7/2001 | |
| KR | 10-2013-0139704 A | 12/2013 | |

(Continued)

OTHER PUBLICATIONS

International Search Report for International application No. PCT/KR2022/002920, Jun. 13, 2022, ISA/KR.

*Primary Examiner* — Alexei Bykhovski
(74) *Attorney, Agent, or Firm* — ArentFox Schiff LLP; Yun H. Choe

(57) ABSTRACT

The present disclosure related to an ultrasonic volume measurement device or system comprising a first ultrasonic array, a second ultrasonic array, an array control unit, and a volume measurement unit, wherein the first ultrasonic array includes multiple first directional elements arranged along a (Continued)

first direction, and transmits a first ultrasonic transmission signal; the second ultrasonic array includes multiple second directional elements arranged along a second direction perpendicular to the first direction, transmitting a second ultrasonic transmission signal, and is disposed on one side of the first ultrasonic array.

13 Claims, 16 Drawing Sheets

(56) References Cited

FOREIGN PATENT DOCUMENTS

| | | |
|---|---|---|
| KR | 10-2015-0027482 A | 3/2015 |
| KR | 10-2020-0128871 A | 11/2020 |
| KR | 10-2021-0032866 A | 3/2021 |

\* cited by examiner

1_1 ULTRASONIC IMAGE (UI1_1)

2_2 ULTRASONIC IMAGE (UI2_2)

FIG. 11

OPERATING MODE (OM)

| SCAN MODE (SCM) | FIRST ULTRASONIC ARRAY |
|---|---|
| SEARCH MODE (SEM) | FIRST ULTRASONIC ARRAY AND SECOND ULTRASONIC ARRAY |

FIG. 12

STEERING ANGLE (SD)

| FIRST ANGLE | REFERENCE ANGLE + 15 |
|---|---|
| SECOND ANGLE | REFERENCE ANGLE + 30 |
| THIRD ANGLE | REFERENCE ANGLE + 45 |

ULTRASONIC VOLUME MEASUREMENT DEVICE AND ULTRASONIC VOLUME MEASUREMENT SYSTEM COMPRISING SAME

CROSS-REFERENCE TO RELATED APPLICATION

This application is a 371 U.S. national stage of PCT/KR2022/002920, filed Mar. 2, 2022, which claims the benefit of Korean Patent Application No. 10-2021-0049928, filed Apr. 16, 2021, the contents of each of which are incorporated herein by reference.

TECHNICAL FIELD

The present disclosure relates to an ultrasonic volume measurement device and an ultrasonic volume measurement system including the same.

BACKGROUND ART

The use of one-dimensional array to measure the volume of a certain area inside the human body may have many difficulties in measuring the exact volume. Recently, various studies have been conducted to solve this problem.

DISCLOSURE

Technical Problem

An object of the present disclosure is to provide an ultrasonic volume measurement device which includes multiple second directional elements arranged in a second direction perpendicular to a first direction in which a first ultrasonic array is disposed and which is capable of accurately determining volume information of a measurement site included in an image region using a second ultrasonic array disposed on one side of the first ultrasonic array.

Technical Solution

In one general aspect, an ultrasonic volume measurement device includes: a first ultrasonic array including multiple first directional elements arranged in a first direction and transmitting a first ultrasonic transmission signal; a second ultrasonic array including multiple second directional elements disposed in a second direction perpendicular to the first direction, transmitting a second ultrasonic transmission signal, and disposed on one side of the first ultrasonic array; an array controller providing control signals to control the first ultrasonic array and the second ultrasonic array; and a volume measurement unit providing volume information of a measurement site included in an image region generated based on a first ultrasonic reception signal received by the first ultrasonic array and a second ultrasonic reception signal received by the second ultrasonic array.

In an embodiment, when the first ultrasonic array and the second ultrasonic array are arranged at a scanning position of a human body, the first ultrasonic array and the second ultrasonic array may be sequentially and alternatively turned on to receive the first ultrasonic reception signal and the second ultrasonic reception signal.

In an embodiment, the second ultrasonic array may transmit the second ultrasonic transmission signal having a steering angle corresponding to a predetermined angle to the measurement site included in the image region and receive the second ultrasonic reception signal reflected from the measurement site.

In an embodiment, the ultrasonic volume measurement device may further include an image providing unit. The image providing unit may provide a first ultrasonic image corresponding to the first ultrasonic reception signal and a second ultrasonic image corresponding to the second ultrasonic reception signal to each array position in which the first ultrasonic array and the second ultrasonic array are arranged.

In an embodiment, the volume measurement unit may calculate maximum area information in which an area of the measurement site is maximum based on the first ultrasonic image provided at each array position and calculate maximum width information in which a width of the measurement site is maximum based on the second ultrasonic image corresponding to the first ultrasonic image to provide volume information of the measurement site.

In an embodiment, an angle between a first straight line connecting the array position to a maximum image point corresponding to a maximum image depth in the first ultrasonic image corresponding to the maximum area information and a second straight line connecting a center of the second ultrasonic array to the maximum image point may be a reference angle, and the steering angle may be greater than the reference angle.

In an embodiment, the array position may be set based on the center of the first ultrasonic array.

In an embodiment, an operating mode of the ultrasonic volume measurement device may include a scan mode and a search mode. In the scan mode, the maximum area information of the measurement site included in the image region may be calculated according to a first ultrasonic image provided using the first ultrasonic array. In the search mode, the maximum width information of the measurement site may be calculated using the second ultrasonic array, when the same position as the maximum area information is detected, while scanning the first ultrasonic array.

In an embodiment, the steering angle may be settable to increase or decrease sequentially according to a predetermined angle interval.

In another general aspect, an ultrasonic volume measurement system includes: a first ultrasonic array including multiple first directional elements arranged in a first direction and transmitting a first ultrasonic transmission signal; a second ultrasonic array including multiple second directional elements disposed in a second direction perpendicular to the first direction, transmitting a second ultrasonic transmission signal, and disposed on one side of the first ultrasonic array; an array controller providing control signals to control the first ultrasonic array and the second ultrasonic array; a volume measurement unit providing volume information of a measurement site included in an image region generated based on a first ultrasonic reception signal received by the first ultrasonic array and a second ultrasonic reception signal received by the second ultrasonic array; and a result providing unit comparing the volume information of the measurement site with predetermined volume reference information and providing a comparison result.

In an embodiment, the array controller may include a first controller and a second controller. The first controller may provide a first control signal to control the first directional elements included in the first ultrasonic array. The second controller may provide a second control signal to control the second directional elements included in the second ultrasonic array.

In another general aspect, an operating method of an ultrasonic volume measurement device includes: transmitting a first ultrasonic transmission signal by a first ultrasonic array including multiple first directional elements arranged in a first direction; transmitting a second ultrasonic transmission signal by a second ultrasonic array including multiple second directional elements arranged in a second direction perpendicular to the first direction; providing, by an array controller, a control signal to control the first ultrasonic array and the second ultrasonic array; and providing, by a volume measurement unit, volume information of the measurement site included in an image region generated based on a first ultrasonic reception signal received by the first ultrasonic array and a second ultrasonic reception signal received by the second ultrasonic array.

In an embodiment, when the first ultrasonic array and the second ultrasonic array are arranged at a scanning position of a human body, the first ultrasonic array and the second ultrasonic array may be sequentially and alternatively turned on to receive the first ultrasonic reception signal and the second ultrasonic reception signal.

In another general aspect, an operating method of an ultrasonic volume measurement system includes: transmitting a first ultrasonic transmission signal by a first ultrasonic array including multiple first directional elements arranged in a first direction; transmitting a second ultrasonic transmission signal by a second ultrasonic array including multiple second directional elements arranged in a second direction perpendicular to the first direction; providing, by an array controller, a control signal to control the first ultrasonic array and the second ultrasonic array; providing, by a volume measurement unit, volume information of the measurement site included in an image region generated based on a first ultrasonic reception signal received by the first ultrasonic array and a second ultrasonic reception signal received by the second ultrasonic array; and comparing, by a result providing unit, the volume information of the measurement site and predetermined volume reference information and providing a comparison result.

In addition to the technical problems of the present disclosure mentioned above, other features and advantages of the present disclosure may be described below or may be clearly understood by those skilled in the art to which the present disclosure pertains from the description.

Advantageous Effects

According to the present disclosure as described above, the following effects are achieved.

The ultrasonic volume measurement device according to the present disclosure includes multiple second directional elements arranged in the second direction perpendicular to the first direction in which the first ultrasonic array is disposed and may accurately determine volume information of a measurement site included in an image region using the second ultrasonic array disposed on one side of the first ultrasonic array.

In addition, other features and advantages of the present disclosure may be newly understood through embodiments of the present disclosure.

BRIEF DESCRIPTION OF THE DRAWINGS

FIG. 11 is a diagram illustrating an operating mode of the ultrasonic volume measurement device of FIG. 1.

FIG. 12 is a diagram illustrating an example of a steering angle applied to the ultrasonic volume measurement device of FIG. 1.

BEST MODE

Figure 1:
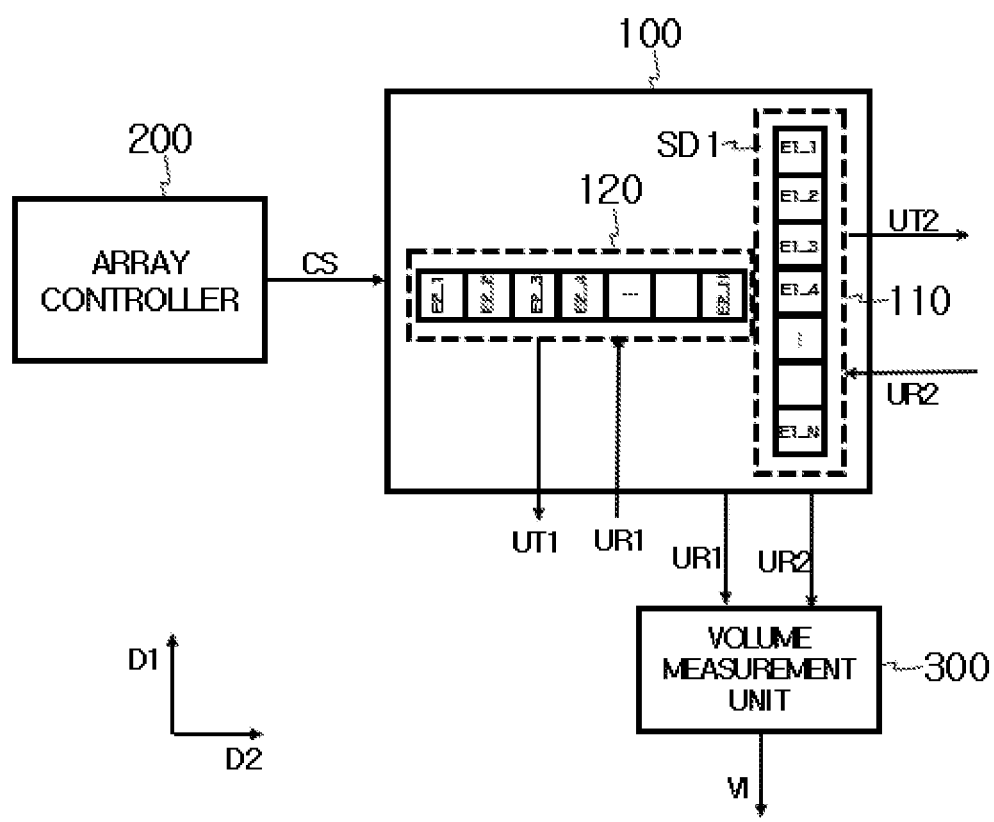
FIG. 1 is a diagram illustrating an ultrasonic volume measurement device according to embodiments of the present disclosure.

In adding reference numerals for elements in each figure, it should be noted that like reference numerals already used to denote like elements in other figures are used for elements wherever possible.

Terms described in the present disclosure may be understood as follows.

Singular forms "a", "an" and "the" in the present disclosure are intended to include the plural forms as well, unless the context clearly indicates otherwise, and such components must not be understood as being limited to the above terms.

It should be further understood that the terms "comprises", "comprising,", "has", "having", "includes" and/or "including", when used herein, specify the presence of stated features, integers, steps, operations, elements, and/or components, but do not preclude the presence or addition of one or more other features, integers, steps, operations, elements, components, and/or groups thereof.

Hereinafter, embodiments of the present disclosure designed to solve the above problems will be described in detail with reference to the accompanying drawings.

Figure 2:
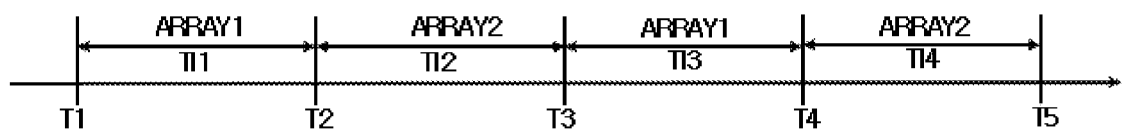
FIG. 2 is a diagram illustrating an embodiment of the ultrasonic volume measurement device of FIG. 1.
Figure 3:
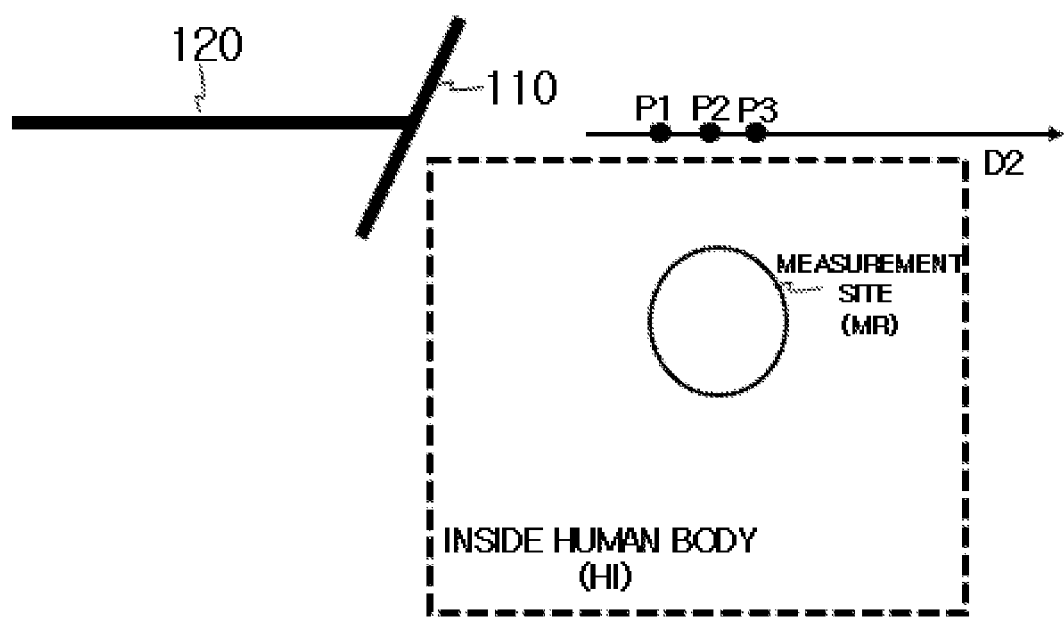
FIG. 3 is a diagram illustrating an operation of the ultrasonic volume measurement device of FIG. 1.
Figure 4:
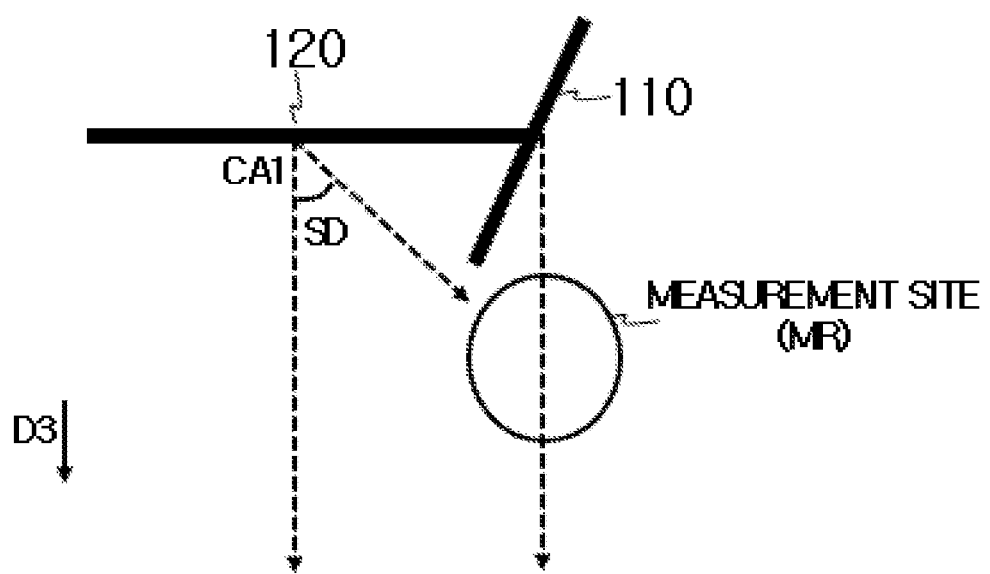
FIG. 4 is a diagram illustrating another operation of the ultrasonic volume measurement device of FIG. 1.

FIG. 1 is a diagram illustrating an ultrasonic volume measurement device according to embodiments of the present disclosure, FIG. 2 is a diagram illustrating an embodiment of the ultrasonic volume measurement device of FIG. 1, FIG. 3 is a diagram illustrating an operation of the ultrasonic volume measurement device of FIG. 1, and FIG. 4 is a diagram illustrating another operation of the ultrasonic volume measurement device of FIG. 1.

Referring to FIGS. 1 to 4, an ultrasonic volume measurement device 10 according to an embodiment of the present disclosure may include a first ultrasonic array 110, a second ultrasonic array 120, an array controller 200, and a volume measurement unit 300.

The first ultrasonic array 110 may include multiple first directional elements arranged in a first direction D1 and may transmit a first ultrasonic transmission signal UT1. For example, multiple first directional elements may include a 1_1 element E1_1 and 1_2 element E1_2 to 1_N element E1_N. The 1_1 element E1_1 and the 1_2 element E1_2 to the 1_N element E1_N may be arranged in the first direction D1, and the first ultrasonic array 110 may transmit a first ultrasonic transmission signal UT1 using the 1_1 element E1_1 and the 1_2 element E1_2 to the 1_N elements E1_N. The second ultrasonic array 120 may include multiple second directional elements arranged in a second direction D2 perpendicular to the first direction D1, transmit a second ultrasonic transmission signal UT2, and may be disposed on one side SD1 of the first ultrasonic array 110. For example, multiple second directional elements may include a 2_1 element E2_1 and 2_2 element to 2_N element E2_N. The 2_1 element E2_1 and the 2_2 element to the 2_N element E2_N may be arranged in the second direction D2 perpendicular to the first direction D1, and the second ultrasonic array 120 may be vertically disposed on one side SD1 of the first ultrasonic array 110. The second ultrasonic array 120 may transmit a second ultrasonic transmission signal UT2 using the 2_1 element E2_1 and the 2_2 element to the 2_N elements E2_N.

The array controller 200 may provide control signals for controlling the first ultrasonic array 110 and the second ultrasonic array 120. The volume measurement unit 300 may provide volume information VI of a measurement site MR included in an image region generated based on a first ultrasonic reception signal UR1 received by the first ultrasonic array 110 and a second ultrasonic reception signal UR2 received by the second ultrasonic array 120.

In an embodiment, when the first ultrasonic array 110 and the second ultrasonic array 120 are disposed at a certain position of a human body, the first ultrasonic array 110 and the second ultrasonic array 120 may be sequentially and alternatively turned on to receive the first ultrasonic reception signal UR1 and the second ultrasonic reception signal UR2. For example, multiple times may include a first time T1, a second time T2, a third time T3, a fourth time T4, and a fifth time T5. A time interval from the first time T1 to the second time T2 may be a first time interval TI1, and a time interval from the second time T2 to the third time T3 may be a second time interval TI2. In addition, a time interval from the third time T3 to the fourth time T4 may be a third time interval TI3, and a time interval from the fourth time T4 to the fifth time T5 may be a fourth time interval TI4.

For example, the center of the first ultrasonic array 110 may be disposed at a first point P1 during the first time interval TI1 and the second time interval TI2. In this case, during the first time interval TI1, the ultrasonic volume measurement device 10 may drive the first ultrasonic array 110 based on a first control signal CS1 to transmit the first ultrasonic transmission signal UT1 and receive the first ultrasonic reception signal UR1 reflected from an object. Meanwhile, during the first time interval TI1, the ultrasonic volume measurement device 10 may turn off the second ultrasonic array 120 based on a second control signal CS2 and not drive the second ultrasonic array 120. During the second time interval TI2, the ultrasonic device may turn off the first ultrasonic array 110 based on the first control signal CS1 and not drive the first ultrasonic array 110, while the ultrasonic device may drive the second ultrasonic array 120 based on the second control signal CS2 to transmit the second ultrasonic transmission signal UT2 and receive the second ultrasonic reception signal UR2 reflected from the object. In an embodiment, the volume measurement device according to the present disclosure may be located at the first point P1 of the human body during the first time interval TI1 and the second time interval TI2 to acquire both the first ultrasonic image UI1 and the second ultrasonic image UI2 of the object imaged at the first point P1.

The first ultrasonic image UI1 and the second ultrasonic image UI2 may be stored in a database, and the volume measurement unit 300 may provide the volume information VI of the measurement site MR included in the image region generated based on the first ultrasonic reception signal UR1 received by the first ultrasonic array 110 and the second ultrasonic reception signal UR2 received by the second ultrasonic array 120.

Thereafter, the center of the first ultrasonic array 110 may be disposed at a second point P2 during the third time interval TI3 and the fourth time interval TI4. In this case, during the third time interval TI3, the ultrasonic volume measurement device 10 may drive the first ultrasonic array 110 based on the first control signal CS1 to transmit the first ultrasonic transmission signal UT1 and receive the first ultrasonic reception signal UR1 reflected from the object. Meanwhile, during the third time interval TI3, the ultrasonic volume measurement device 10 may turn off the second ultrasonic array 120 based on the second control signal CS2 and not drive the second ultrasonic array 120. During the fourth time interval TI4, the ultrasonic volume measurement device 10 may turn off the first ultrasonic array 110 based on the first control signal CS1 and not drive the first ultrasonic array 110, and meanwhile, the ultrasonic volume measurement device 10 may drive the second ultrasonic array 120 based on the second control signal CS2 to transmit the second ultrasonic transmission signal UT2 and receive the second ultrasonic reception signal UR2 reflected from the object. In an embodiment, the volume measurement device according to the present disclosure may be located at the second point P2 of the human body during the third time interval TI3 and the fourth time interval TI4 and acquire both the first ultrasonic image UI1 and the second ultrasonic image UI2 of the object captured at the second point P2. The first ultrasonic image UI1 and the second ultrasonic image UI2 may be stored in a database, and the volume measurement unit 300 may provide the volume information VI of the measurement site MR included in the image region generated based on the first ultrasonic reception signal UR1 received by the first ultrasonic array 110 and the second ultrasonic reception signal UR2 received by the second ultrasonic array 120.

In an embodiment, the second ultrasonic array 120 may transmit the second ultrasonic transmission signal UT2 having a steering angle SD corresponding to a predetermined angle to the measurement site MR included in the image region and receive the second ultrasonic reception signal UR2 reflected from the measurement site MR. For example, in order to acquire an image including the measurement site MR using the second ultrasonic array 120, a delay applied to multiple second directional elements included in the second ultrasonic array 120 may be changed. When the delay applied to the second directional elements changes, the steering angle SD of the second ultrasonic array 120 may be changed.

The ultrasonic volume measurement device 10 according to the present disclosure may include multiple second directional elements arranged in the second direction D2 perpendicular to the first direction D1 in which the first ultrasonic array 110 is disposed, and may accurately identify the volume information VI of the measurement site MR included in the image region using the second ultrasonic array 120 disposed on one side SD1 of the first ultrasonic array 110.

In the above, the operation of alternately scanning the first ultrasonic array 110 and the second ultrasonic array 120 by dividing time is described. However, the ultrasonic device 10 according to the present disclosure may transmit an ultrasonic transmission signal using the first ultrasonic array 110 and the second ultrasonic array 120 simultaneously, receive an ultrasonic reception signal reflected from the object using the first ultrasonic array 110 and the second ultrasonic array 120 simultaneously, and perform signal processing, thereby acquiring an ultrasonic image.

In addition, the ultrasonic volume measurement device 10 according to an embodiment of the present disclosure may measure a length of the deepest part of a bladder using the first ultrasonic array 110 and measure a height of an image acquired from the bladder using the second ultrasonic array 120 disposed at an angle of 90 degrees with the first ultrasonic array 110, thereby measuring a three-dimensional volume of the bladder.

Figure 5:
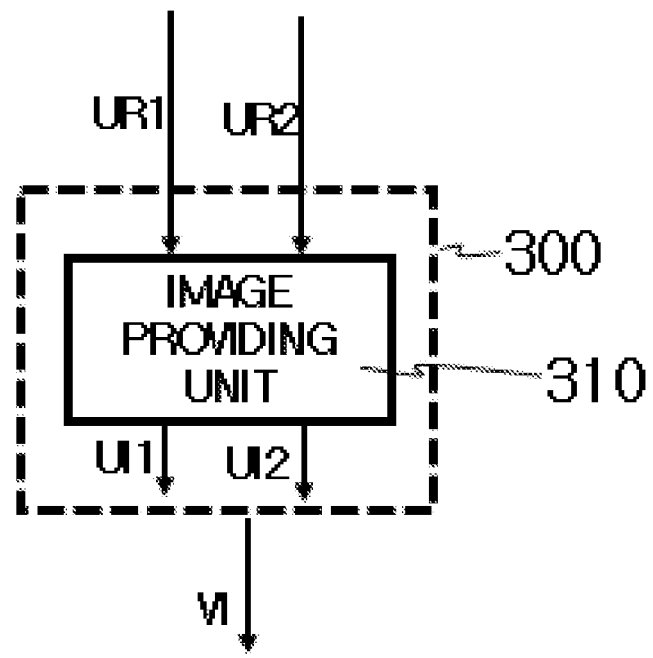
FIG. 5 is a diagram illustrating an image providing unit included in the ultrasonic volume measurement device of FIG. 1.
Figure 6:
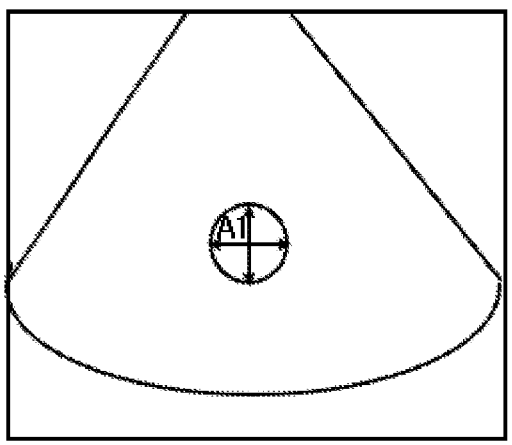
FIGS. 6 and 7 are diagrams illustrating first ultrasonic images generated using a first ultrasonic array included in the ultrasonic volume measurement device of FIG. 1.
Figure 7:
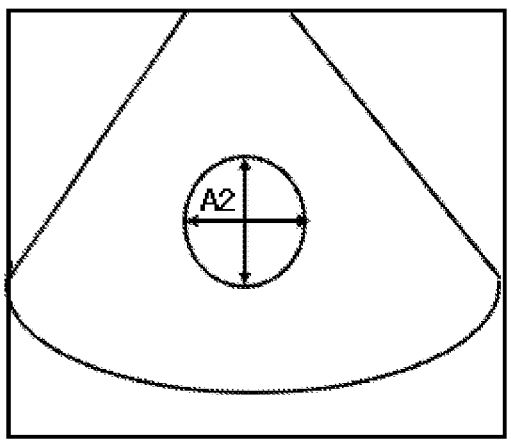
Figure 8:
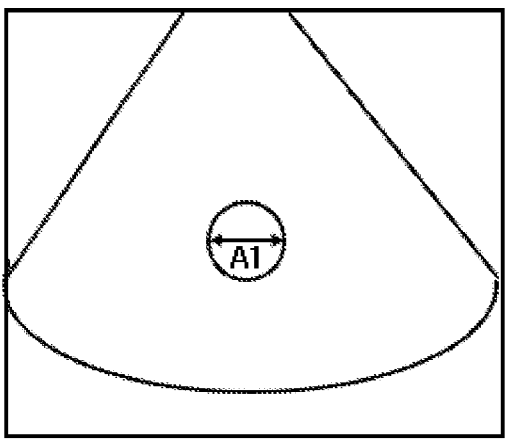
FIGS. 8 and 9 are diagrams illustrating second ultrasonic images generated using a second ultrasonic array included in the ultrasonic volume measurement device of FIG. 1.
Figure 9:
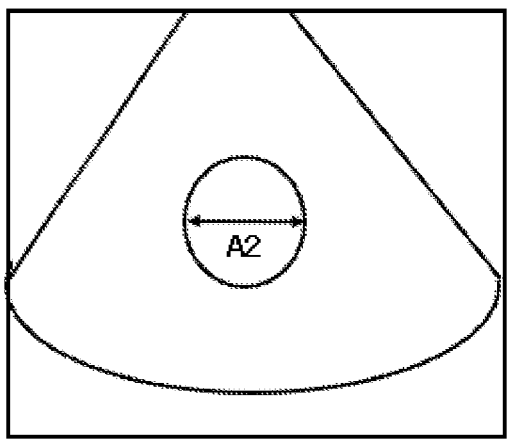

FIG. 5 is a diagram illustrating an image providing unit included in the ultrasonic volume measurement device of FIG. 1, FIGS. 6 and 7 are diagrams illustrating first ultrasonic images generated using a first ultrasonic array included in the ultrasonic volume measurement device of FIG. 1, and FIGS. 8 and 9 are diagrams illustrating second ultrasonic images UI2 generated using a second ultrasonic array included in the ultrasonic volume measurement device of FIG. 1.

Referring to FIGS. 1 to 9, the ultrasonic volume measurement device 10 may further include an image providing unit 310. The image providing unit 310 may provide the first ultrasonic image UI1 corresponding to the first ultrasonic reception signal UR1 and the second ultrasonic image UI2 corresponding to the second ultrasonic reception signal UR2 at each array position in which the first ultrasonic array 110 and the second ultrasonic array 120 are arranged. For example, when the center of the first ultrasonic array 110 is disposed at the first point P1, the 1_1 ultrasonic image U1_1 generated based on the first ultrasonic reception signal UR1 received by the first ultrasonic array 110 may be illustrated as shown in FIG. 6, and the height and width of the measurement site MR shown in FIG. 6 may be A1. Thereafter, the second ultrasonic transmission signal UT2 may be transmitted to the measurement site MR using the second ultrasonic array 120, and the 2_1 ultrasonic image U2_1 generated based on the second ultrasonic reception signal UR2 received from the measurement site MR may be illustrated as shown in FIG. 8, and the width of the measurement site MR shown in FIG. 8 may be A1.

Thereafter, the first ultrasonic array 110 and the second ultrasonic array 120 may move to the second point P2. When the center of the first ultrasonic array 110 is located at the second point P2, the 1_2 ultrasonic image U1_2 generated based on the first ultrasonic reception signal UR1 received by the first ultrasonic array 110 may be illustrated as shown in FIG. 7, and the height and width of the measurement site MR shown in FIG. 7 may be A2. Thereafter, the second ultrasonic transmission signal UT2 may be transmitted to the measurement site MR using the second ultrasonic array 120, the 2_2 ultrasonic image U2_2 generated based on the second ultrasonic reception signal UR2 received from the measurement site MR may be illustrated as shown in FIG. 9, and the width of the measurement site MR shown in FIG. 9 may be A2.

The volume measurement unit 300 may provide the volume information VI of the measurement site MR based on the first ultrasonic image UI1 generated according to the first ultrasonic reception signal UR1 received by the first ultrasonic array 110 and the second ultrasonic image UI2 generated according to the second ultrasonic reception signal UR2 received by the second ultrasonic array 120. For example, the volume information VI of the measurement site MR may be identified using parameters including the height and width of the measurement site MR included in the 1_1 ultrasonic image U1_1 and the width and the steering angle of the measurement site included in the 2_1 ultrasonic image U2_1.

In an embodiment, the volume measurement unit 300 may calculate maximum area information in which the area of the measurement site MR is maximum based on the first ultrasonic image UI1 provided at each array position and calculate maximum width information in which the width of the measurement site MR is maximum based on the second ultrasonic image UI2 corresponding to the first ultrasonic image UI1 to provide the volume information VI of the measurement site M4. For example, when the center of the first ultrasonic array 110 is located at the second point P2, the height and width of the measurement site MR included in the 1_2 ultrasonic image U1_2 may be maximum and the width of the measurement site MR included in the 2_2 ultrasonic image U2_2 may be maximum. In this case, the volume measurement unit 300 may provide the maximum volume information VI of the measurement site MR using parameters including the height and width of the measurement site MR included in the 1_2 ultrasonic image U1_2 and the width and steering angle of the measurement site MR included in the 2_2 ultrasonic image U2_2. The parameters may be used to correct the width of the measurement site MR included in the 2_2 ultrasonic image U2_2.

Figure 10:
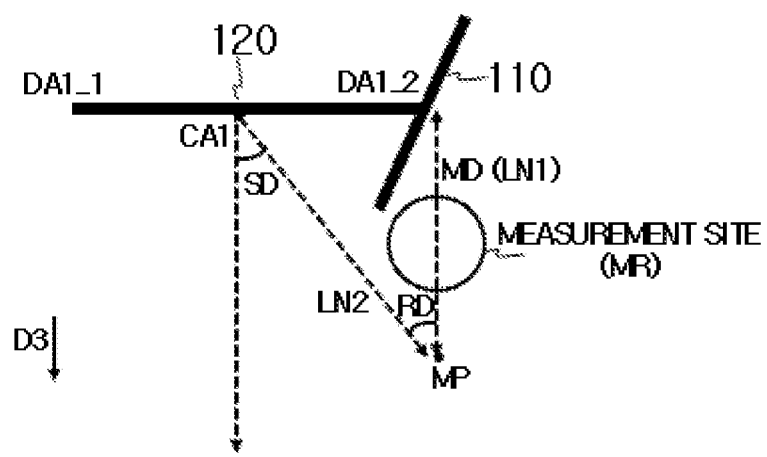
FIG. 10 is a diagram illustrating a steering angle applied to the ultrasonic volume measurement device of FIG. 1.

FIG. 10 is a diagram illustrating a steering angle applied to the ultrasonic volume measurement device of FIG. 1, FIG. 11 is a diagram illustrating an operating mode of the ultrasonic volume measurement device of FIG. 1, and FIG. 12 is a diagram illustrating an example of a steering angle applied to the ultrasonic volume measurement device of FIG. 1.

Referring to FIGS. 1 to 12, in an embodiment, an angle between a first straight line LN1 connecting the first ultrasonic image UI1 corresponding to the maximum area information from the array position to the maximum image point MP corresponding to the maximum image depth MD and a second straight line LN2 connecting the center CA1 of the second ultrasonic array 120 to the maximum image point MP may be the reference angle RD, and the steering angle SD may be greater than the reference angle RD. For example, in order to acquire an image including the measurement site MR using the second ultrasonic array 120, the delay applied to multiple second directional elements included in the second ultrasonic array 120 may change. When the delay applied to the second directional elements changes, the steering angle SD of the second ultrasonic array 120 may be changed. When the steering angle SD of the second ultrasonic array 120 is set to be greater than the reference angle RD, a larger second directional ultrasonic image around the measurement site MR may be acquired. In an embodiment, the array position may be set based on the center of the first ultrasonic array 110.

In an embodiment, an operating mode OM of the ultrasonic volume measurement device may include a scan mode SCM and a search mode SEM. In the scan mode SCM, maximum area information of the measurement site MR included in the image region may be calculated according to the first ultrasonic image UI1 provided using the first ultrasonic array 110. In the search mode SEM, if the same position as the maximum width information is detected while scanning using the first ultrasonic array 110, the maximum area information of the measurement site MR may be calculated using the second ultrasonic array 120.

For example, while the ultrasonic volume measurement device 10 operates in the scan mode SCM, the ultrasonic volume measurement device 10 may scan the height and width of the measurement site MR and calculate area information using the first ultrasonic array 110, while moving to the first point P1, the second point P2, and the third point P3. The area information of the first point P1 to the third point P3 may be stored in a database. Thereafter, the ultrasonic volume measurement device 10 may operate in the search mode SEM. While the ultrasonic volume measurement device 10 is operating in search mode SEM, when a second point P2 corresponding to the same position as the maximum area information is detected while scanning using the first ultrasonic array 110, the ultrasonic volume measurement device 10 may transmit the second ultrasonic transmission signal UT2 to the measurement site MR using the second ultrasonic array 120 and calculate maximum width information of the measurement site MR based on the second ultrasonic reception signal UR2 received from the measurement site MR.

In an embodiment, the steering angle SD may be set to sequentially increase or decrease according to a predetermined angle interval. For example, when the steering angle SD is set to a first angle, the steering angle SD may be set as an angle obtained by adding 15 degrees to the reference angle RD, and when the steering angle SD is set to a second angle, the steering angle SD may be set as an angle obtained by adding 30 degrees to the reference angle RD. In addition, when the steering angle SD is set to a third angle, the steering angle SD may be set as an angle obtained by adding 45 degrees to the reference angle RD. A user of the ultrasonic volume measurement device 10 according to the present disclosure may adjust the steering angle SD to acquire an appropriate image of the surrounding area including the measurement site MR.

The ultrasonic volume measurement device 10 according to the present disclosure may include multiple second directional elements arranged in the second direction D2 perpendicular to the first direction D1 in which the first ultrasonic array 110 is disposed, and may accurately identify the volume information VI of the measurement site MR included in the image region using the second ultrasonic array 120 disposed on one side SD1 of the first ultrasonic array 110.

Figure 13:
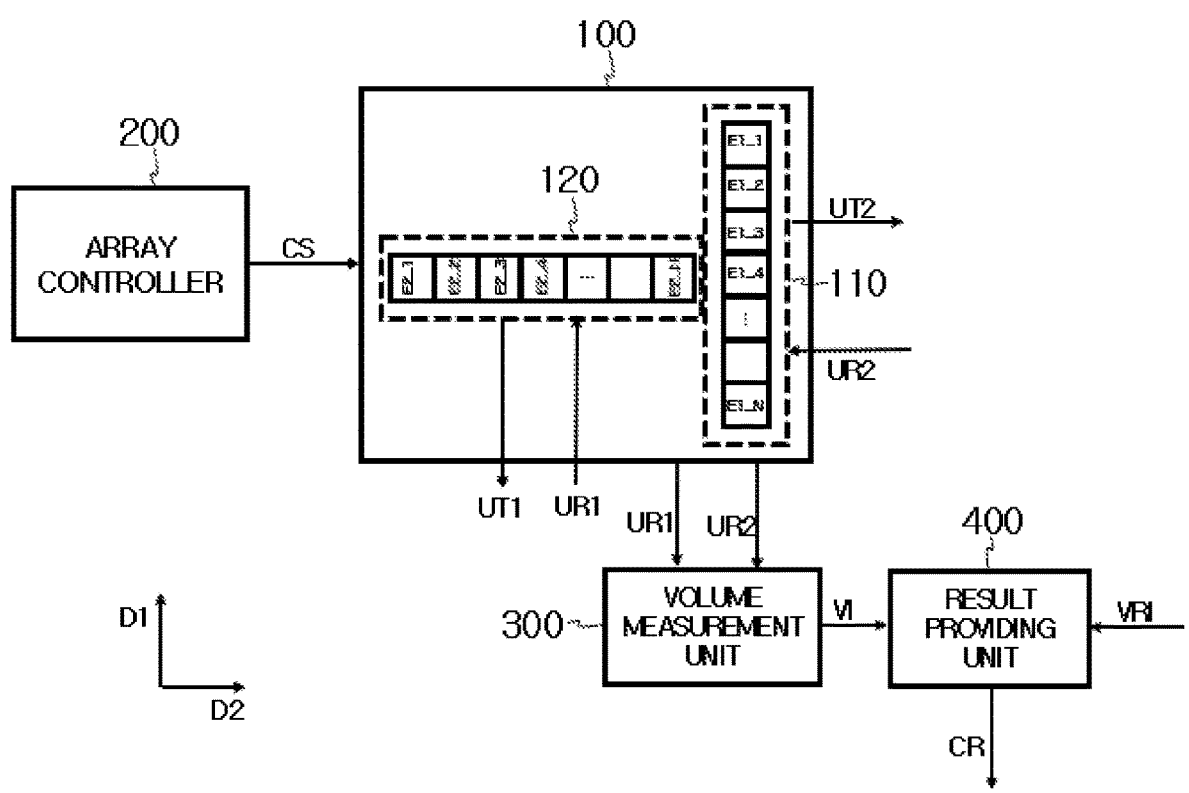
FIG. 13 is a diagram illustrating an ultrasonic imaging device according to embodiments of the present disclosure.
Figure 14:
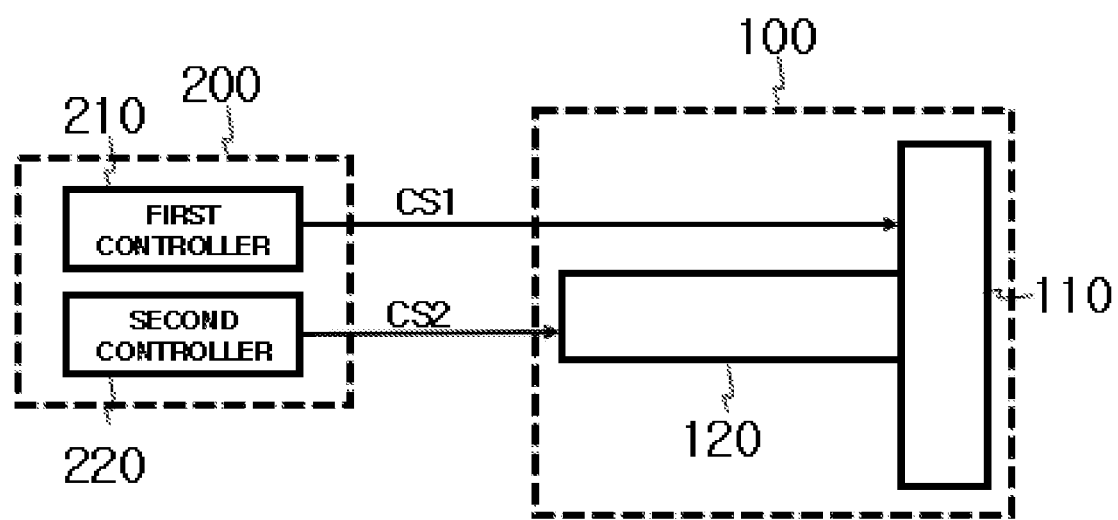
FIG. 14 is a diagram illustrating an operation of an array controller included in the ultrasonic imaging device of FIG. 13.

FIG. 13 is a diagram illustrating an ultrasonic imaging device according to embodiments of the present disclosure, and FIG. 14 is a diagram illustrating an operation of an array controller included in the ultrasonic imaging device of FIG. 13.

Referring to FIGS. 1 to 14, the ultrasonic volume measurement system according to an embodiment of the present disclosure may include a first ultrasonic array 110, a second ultrasonic array 120, an array controller 200, a volume measurement unit 300, and a result providing unit 400. The first ultrasonic array 110 may include multiple first directional elements arranged in the first direction D1 and may transmit the first ultrasonic transmission signal UT1. The second ultrasonic array 120 may include multiple second directional elements arranged in the second direction D2 perpendicular to the first direction D1, transmit the second ultrasonic transmission signal UT2, and may be disposed on one side SD1 of the first ultrasonic array 110. The array controller 200 may provide control signals for controlling the first ultrasonic array 110 and the second ultrasonic array 120. The volume measurement unit 300 may provide the volume information VI of the measurement site MR included in the image region generated based on the first ultrasonic reception signal UR1 received by the first ultrasonic array 110 and the second ultrasonic reception signal UR2 received by the second ultrasonic array 120. The result providing unit 400 may compare the volume information VI of the measurement site MR with a predetermined volume reference information VRI and provide a comparison result CR.

In an embodiment, the array controller 200 may include a first controller 210 and a second controller 220. The first controller 210 may provide a first control signal CS1 for controlling the first directional elements included in the first ultrasonic array 110. The second controller 220 may provide a second control signal CS2 for controlling the second directional elements included in the second ultrasonic array 120. For example, the first controller 210 may provide the first ultrasonic transmission signal UT1 by driving only the odd-numbered elements, among the 1_1 element E1_1 and the 1_2 element E1_2 to the 1_N elements E1_N corresponding to multiple first directional elements based on the first control signal CS1, and may provide the first ultrasonic transmission signal UT1 by turning off some elements on both sides based on the center of the first ultrasonic array, among the 1_1 element E1_1 and the 1_2 element E1_2 to the 1_N element E1_N corresponding to multiple first directional elements.

The second controller 220 may provide the second control signal CS2 for controlling the second directional elements included in the second ultrasonic array 120. For example, the second controller 220 may provide the second ultrasonic transmission signal UT2 by driving only the even-numbered elements, among the 2_1 element E2_1 and the 2_2 element to the 2_N element E2_N corresponding to multiple second directional elements based on the second control signal CS2, and may provide the second ultrasonic transmission signal UT2 by turning off some elements on both sides based on the center of the second ultrasonic array, among the 2_1 element E2_1 and the 2_2 element to the 2_N element E2_N corresponding to multiple second directional elements.

Figure 15:
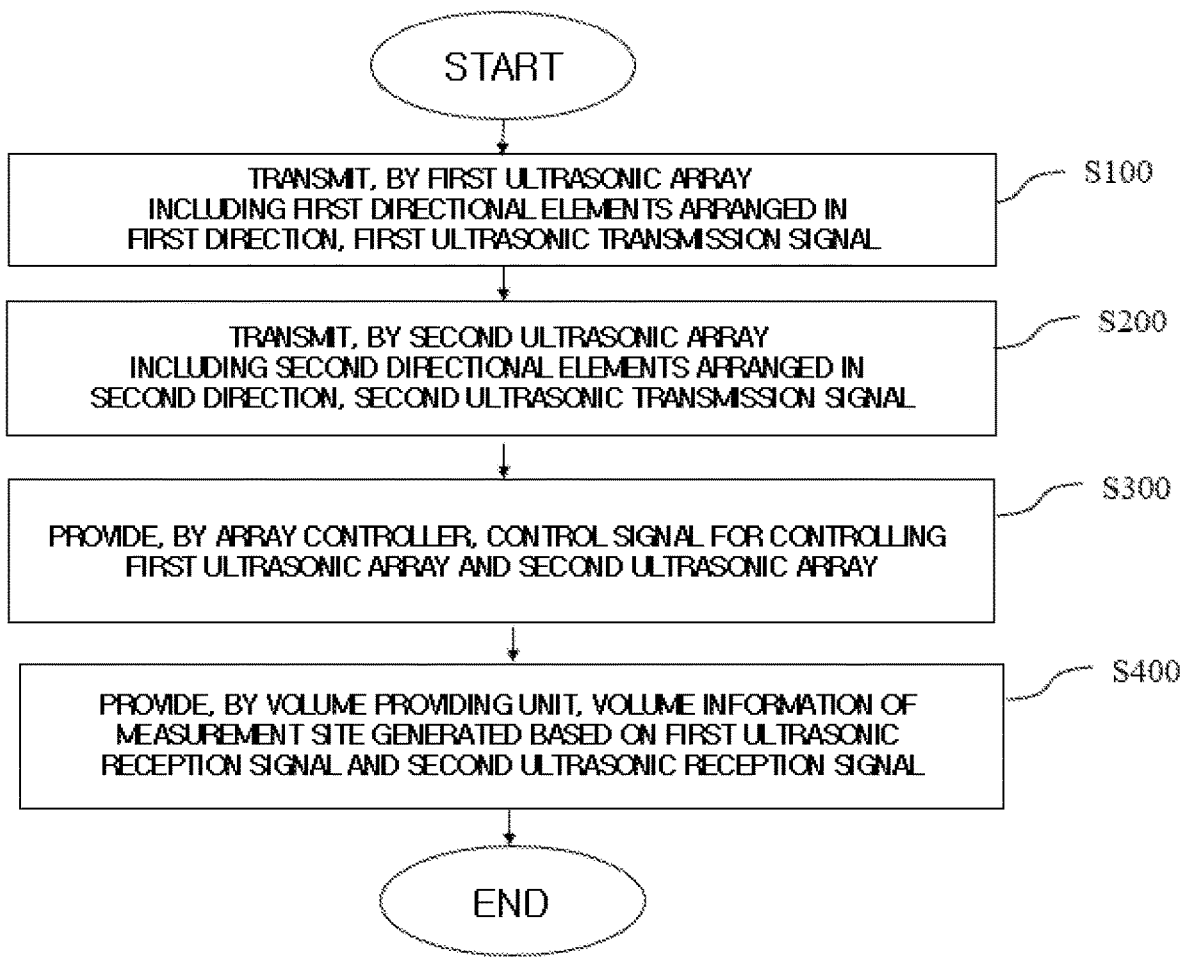
FIG. 15 is a flowchart illustrating an operating method of an ultrasonic device according to embodiments of the present disclosure.

FIG. 15 is a flowchart illustrating an operating method an ultrasonic device according to embodiments of the present disclosure.

Referring to FIGS. 1 to 15, in the operating method of the ultrasonic volume measurement device 10 according to an embodiment of the present disclosure, the first ultrasonic array 110 including multiple first directional elements arranged in the first direction D1 may transmit the first ultrasonic transmission signal UT1 (S100). The second ultrasonic array 120 including multiple second directional elements arranged in the second direction D2 perpendicular to the first direction D1 may transmit the second ultrasonic transmission signal UT2 (S200). The array controller 200 may provide a control signal to control the first ultrasonic array 110 and the second ultrasonic array 120 (S300). The volume measurement unit 300 may provide the volume information VI of the measurement site MR included in the image region generated based on the first ultrasonic reception signal UR1 received by the first ultrasonic array 110 and the second ultrasonic reception signal UR2 received by the second ultrasonic array 120 (S400).

In an embodiment, when the first ultrasonic array 110 and the second ultrasonic array 120 are disposed at a scanning position of the human body, the first ultrasonic reception signal UR1 and the second ultrasonic reception signal UR2 may be received by sequentially and alternately turning on the first ultrasonic array 110 and the second ultrasonic array 120.

Figure 16:
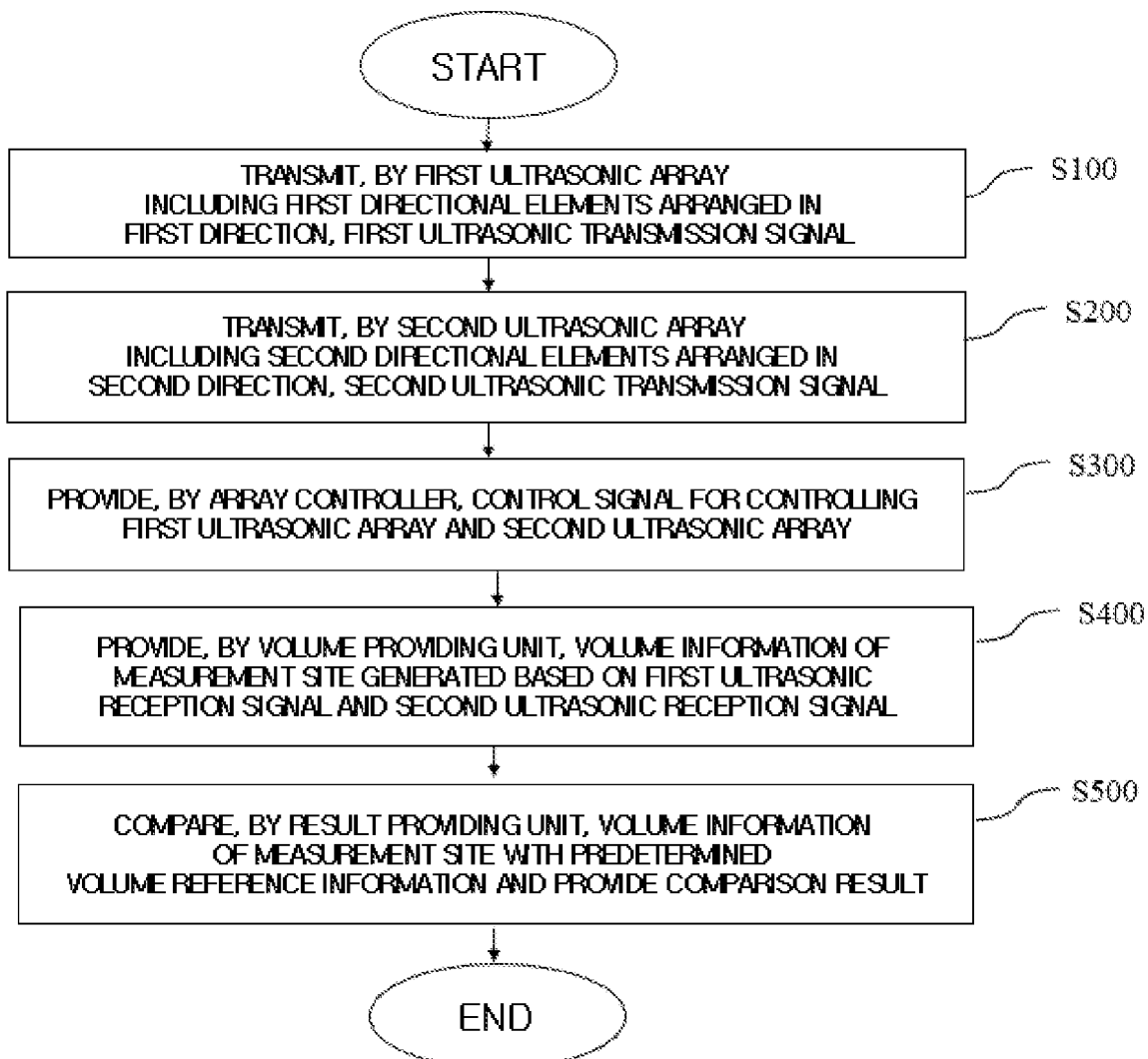
FIG. 16 is a flowchart illustrating an operating method of an ultrasonic imaging device according to embodiments of the present disclosure.

FIG. 16 is a flowchart illustrating an operating method of an ultrasonic imaging device according to embodiments of the present disclosure.

Referring to FIGS. 1 to 16, in the operating method of the ultrasonic volume measurement system according to an embodiment of the present disclosure, the first ultrasonic array 110 including multiple first directional elements arranged in the first direction D1 may transmit the first ultrasonic transmission signal UT1 (S100). The second ultrasonic array 120 including multiple second directional elements arranged in the second direction D2 perpendicular to the first direction D1 may transmit the second ultrasonic transmission signal UT2 (S200). The array controller 200 may provide a control signal to control the first ultrasonic array 110 and the second ultrasonic array 120 (S300). The volume measurement unit 300 may provide the volume information VI of the measurement site MR included in the image region generated based on the first ultrasonic reception signal UR1 received by the first ultrasonic array 110 and the second ultrasonic reception signal UR2 received by the second ultrasonic array 120 (S400). The result providing unit 400 may compare the volume information VI of the measurement site MR with the predetermined volume reference information VRI and provide the comparison result CR (S500).

In the operating method of the ultrasonic volume measurement system according to the present disclosure, multiple second directional elements arranged in the second direction D2 perpendicular to the first direction D1 in which the first ultrasonic array 110 is disposed may be included, and the volume information VI of the measurement site MR included in the image region may be accurately identified using the second ultrasonic array 120 disposed on one side SD1 of the first ultrasonic array 110.

The invention claimed is:

1. An ultrasonic volume measurement device or system comprising:
    a first ultrasonic array including multiple first directional elements arranged in a first direction and configured to transmit a first ultrasonic transmission signal;
    a second ultrasonic array including multiple second directional elements disposed in a second direction perpendicular to the first direction, configured to transmit a second ultrasonic transmission signal, and disposed on one side of the first ultrasonic array;
    an array controller configured to provide control signals to control the first ultrasonic array and the second ultrasonic array; and
    a volume measurement unit configured to provide volume information of a measurement site included in an image region generated based on a first ultrasonic reception signal received by the first ultrasonic array and a second ultrasonic reception signal received by the second ultrasonic array,
    wherein the first ultrasonic array and the second ultrasonic array are configured to be arranged at a scanning position of a human body, wherein the first ultrasonic array and the second ultrasonic array are configured to be sequentially and alternatively turned on to receive the first ultrasonic reception signal and the second ultrasonic reception signal.

2. The ultrasonic volume measurement device or system of claim 1, wherein the second ultrasonic array is configured to:
    transmit the second ultrasonic transmission signal having a steering angle corresponding to a predetermined angle to the measurement site included in the image region and receive the second ultrasonic reception signal reflected from the measurement site.

3. The ultrasonic volume measurement device or system of claim 2, further comprising an image providing unit providing a first ultrasonic image corresponding to the first ultrasonic reception signal and a second ultrasonic image corresponding to the second ultrasonic reception signal for each array position in which the first ultrasonic array and the second ultrasonic array are arranged.

4. The ultrasonic volume measurement device or system of claim 2, wherein the volume measurement unit calculates maximum area information in which an area of the measurement site is maximum based on the first ultrasonic image provided at each array position and calculates maximum width information in which a width of the measurement site is maximum based on the second ultrasonic image corresponding to the first ultrasonic image to provide volume information of the measurement site.

5. The ultrasonic volume measurement device or system of claim 4, wherein an angle between a first straight line connecting the each array position to a maximum image point corresponding to a maximum image depth in the first ultrasonic image corresponding to the maximum area information and a second straight line connecting a center of the second ultrasonic array to the maximum image point is a reference angle, and the steering angle is greater than the reference angle.

6. The ultrasonic volume measurement device or system of claim 4, wherein the each array position is set based on a center of the first ultrasonic array.

7. The ultrasonic volume measurement device or system of claim 6, wherein an operating mode of the ultrasonic volume measurement device includes a scan mode and a search mode, and in the scan mode, the maximum area information of the measurement site included in the image region is calculated according to a first ultrasonic image provided using the first ultrasonic array, and in the search mode, the maximum width information of the measurement site is calculated using the second ultrasonic array by acquiring a second ultrasonic image at an image depth corresponding to an image depth of the first ultrasonic the image that was used to calculate the maximum area information.

8. The ultrasonic volume measurement device or system of claim 7, wherein the steering angle is settable to increase or decrease sequentially according to a predetermined angle interval.

9. The ultrasonic volume measurement device or system of claim 1, wherein the ultrasonic volume measurement system further comprising:
    a result providing unit comparing the volume information of the measurement site with predetermined volume reference information and providing a comparison result.

10. The ultrasonic volume measurement device or system of claim 9, wherein the array controller includes:

a first controller providing a first control signal to control the first directional elements included in the first ultrasonic array; and a second controller providing a second control signal to control the second directional elements included in the second ultrasonic array.

11. An operating method of the ultrasonic volume measurement device or system of claim 1, the operating method comprising:

transmitting the first ultrasonic transmission signal by the first ultrasonic array including multiple first directional elements arranged in the first direction;

transmitting the second ultrasonic transmission signal by the second ultrasonic array including multiple second directional elements arranged in the second direction perpendicular to the first direction;

providing, by the array controller, the control signal to control the first ultrasonic array and the second ultrasonic array; and providing, by the volume measurement unit, volume information of the measurement site included in the image region generated based on the first ultrasonic reception signal received by the first ultrasonic array and the second ultrasonic reception signal received by the second ultrasonic array;

arranging the first ultrasonic array and the second ultrasonic array at a scanning position of a human body; and sequentially and alternatively turning on the first ultrasonic array and the second ultrasonic array to receive the first ultrasonic reception signal and the second ultrasonic reception signal.

12. The operating method of claim 11, wherein, for the system, the operating method further comprising:

comparing, by a result providing unit, the volume information of the measurement site and predetermined volume reference information and providing a comparison result.

13. The operating method of claim 12, wherein the second ultrasonic array transmits the second ultrasonic transmission signal having a steering angle corresponding to a predetermined angle to the measurement site included in the image region and receives the second ultrasonic reception signal reflected from the measurement site.

* * * * *